United States Patent [19]
Kisko et al.

[11] Patent Number: 6,095,093
[45] Date of Patent: Aug. 1, 2000

[54] ANIMAL LEASH ASSEMBLY

[76] Inventors: Mary Kisko, 710 Brookside Dr.; Lisa Glickstein, 5 Dublin Ct., both of Toms River, N.J. 08753

[21] Appl. No.: 09/268,798

[22] Filed: Mar. 16, 1999

[51] Int. Cl.[7] .............................. A62B 35/00; B60R 22/00
[52] U.S. Cl. .......................... 119/770; 119/792; 119/795; 119/797; 119/798; 224/220; 224/221
[58] Field of Search .................................. 119/770, 795, 119/792, 797, 798; 224/184, 220, 221; D30/153

[56] References Cited

U.S. PATENT DOCUMENTS

| | | | |
|---|---|---|---|
| D. 337,395 | 7/1993 | Erlinger et al. | D30/153 |
| D. 359,599 | 6/1995 | Archambault | D30/153 |
| 2,661,888 | 12/1953 | Sidlinger | 2/1 |
| 4,999,853 | 3/1991 | Tannner | 2/321 |
| 5,161,486 | 11/1992 | Brown | 119/795 |
| 5,649,504 | 7/1997 | Culp | 119/795 |
| 5,699,555 | 12/1997 | Schunter | 2/1 |
| 5,718,189 | 2/1998 | Blake | 119/770 |
| 5,806,466 | 9/1998 | Pintor et al. | 119/770 |
| 5,842,444 | 12/1998 | Perrulli | 119/770 |

*Primary Examiner*—Peter M. Poon
*Assistant Examiner*—Judith A. Nelson
*Attorney, Agent, or Firm*—Clifford G. Frayne

[57] ABSTRACT

An animal leash assembly for positioning about the humerus portion of the arm of an individual in contemplation of an exercise regime in which an animal would accompany the user in a walking, 5 jogging or running mode, the leash assembly having an elastic band member defining a chamber for positioning about the humerus portion of the arm of the individual, a reinforced spine member mounted on the elastic band member for positioning about the posterior portion of the humerus portion of the arm of the user, a fastening member mounted on the elastic band member in spaced apart relationship from the reinforced spine member, an elastic line member mounted to the fastening member and having an animal leash engaging coupling member and an adjustable restraint mounted on the elastic band member for maintaining the elastic band member in position about the humerus portion of the arm of the individual during the exercise regime.

13 Claims, 4 Drawing Sheets

ANIMAL LEASH ASSEMBLY

BACKGROUND OF THE INVENTION

1. Field of Invention

The invention relates to a leash assembly for dogs or other animals or possibly young children, and more particularly to an upper arm mounted leash permitting the user to walk, power walk, jog or run utilizing the pumping of the arms or a swinging arm motion while minimizing the transmission of the pumping action force to the animal.

2. Description of the Prior Art

Dog leashes or animal leashes are well-known in the prior art and in their simplest form consist of a leash in which a first end is secured to the collar of the dog or animal, the collar being worn about the neck of the dog or animal and the second end being retained in the hand of the individual or in some instances wrapped about the wrist of the individual.

Such a leash serves the general purpose of keeping the user in control over the dog or the animal, particularly when the user and the dog or the animal are exercising or walking utilizing a leisure type stroll or pace.

Oftentimes, however, the individual desires to an exercise benefit along with the dog or animal by either power walking, jogging or running while retaining the dog or animal on the leash. In such instances, a hand held leash is oftentimes undesirable since it introduces pulling forces which are uncomfortable to both the user and the animal. Such an instance is when the user is jogging or running with a pumping action of the arms. The upward pump of the arms tightens or shortens the leash putting an undesirable force to the dog or animal's neck. The downward pumping of the arms produces slack in the leash which may allow the animal to accelerate and thus put an undue or undesirable force on the user. These resultant forces are as a result of the leash being held by the hand or by the wrist of the user such that the wrist goes through a large arc during the pumping motion such as from slightly lower than waist high to approximately shoulder height.

Attempts have been made to avoid these unwanted pulling forces in U.S. Pat. No. 5,718,189 to Blake, in which a waist mounted leash belt was disclosed so that the user would be hands free while still controlling the dog or other animal. The waist mounted leash has its drawbacks in that it contributes an extra cumbersome piece of equipment for use in the simple task of walking or exercising the dog or other animal.

Applicant's upper arm mounted leash provides the hands free environment while exercising the dog or animal, maintains control over the dog or animal, and allows the user and the dog or animal to exercise at an increased rate, such as power walking, jogging or a full run without subjecting the dog, animal or user to any deleterious pulling forces. This is accomplished by removably securing the leash to the assembly on the upper arm of the user, which is proximate to the shoulder joint and therefore greatly reduces the degree of arc to which the leash is subjected when the user runs with a pumping arm motion.

Additionally, it is desirable that such an arm band provides sufficient security for control of the animal, but does not interfere with the brachial artery and circulation of blood in the arm. This is accomplished by Applicant's novel leash assembly which incorporates a reinforced spinal member so as to provide the necessary support and flexibility without interfering with blood circulation in the arm.

OBJECTS OF THE INVENTION

An object of the present invention is to provide for a leash, for dogs or other animals, which allows the user to retain control over the dog or other animal while still providing a hands free environment for the user.

Another object of the present invention is to provide for a novel leash for dogs or other animals which allows the user to ran with a pumping motion of the arms without generating deleterious pulling forces to either the dog, animal or the user.

A still further object of the present invention is to provide for a novel leash for dogs or other animals which permits the user to power walk or jog at a rate greater than a normal walk without generating a deleterious pulling effect to the dog, animal or user.

A still further object of the present invention is to provide for a novel leash for dogs or animals which reduces the amount of arc which the leash is subjected to when the user is exercising with the dog or other animal and utilizing his or her arms in a pumping action.

A still further object of the present invention is to provide for a novel leash for dogs or other animals which provides for quick release of the leash from the upper arm location to which it is secured.

A still further object of the present invention is to provide for a novel leash assembly for dogs or other animals which provides the user with positive control over the dog or other animal, yet does not interfere with the circulation of the blood in the user's arm.

SUMMARY OF THE INVENTION

There is disclosed an animal leash assembly for positioning about the humerus portion of the arm of an individual, namely the upper arm, in contemplation of an exercise regime such as walking, jogging or running with the dog or animal, and comprised of elastic band or sleeve member defining a chamber for positioning about the humerus portion of the arm of the individual, a reinforced spine member mounted on the elastic band member for positioning about the posterior portion of the humerus portion of the arm for additional support and the protection of circulation and a fastening member mounted on the elastic band member in spaced apart relationship to the reinforced spine member for securing a leash engaging coupling for the leash of the dog or the animal and an adjustable restraining means mounted on the elastic band member for maintaining the elastic band member in position about the humerus portion of the individual's arm.

BRIEF DESCRIPTION OF THE DRAWINGS

These and other objects of the present invention will become more readily apparent, particularly when taken in light of the following description when taken with the accompanying drawings wherein.

DETAILED DESCRIPTION OF THE DRAWINGS

Figure 1:
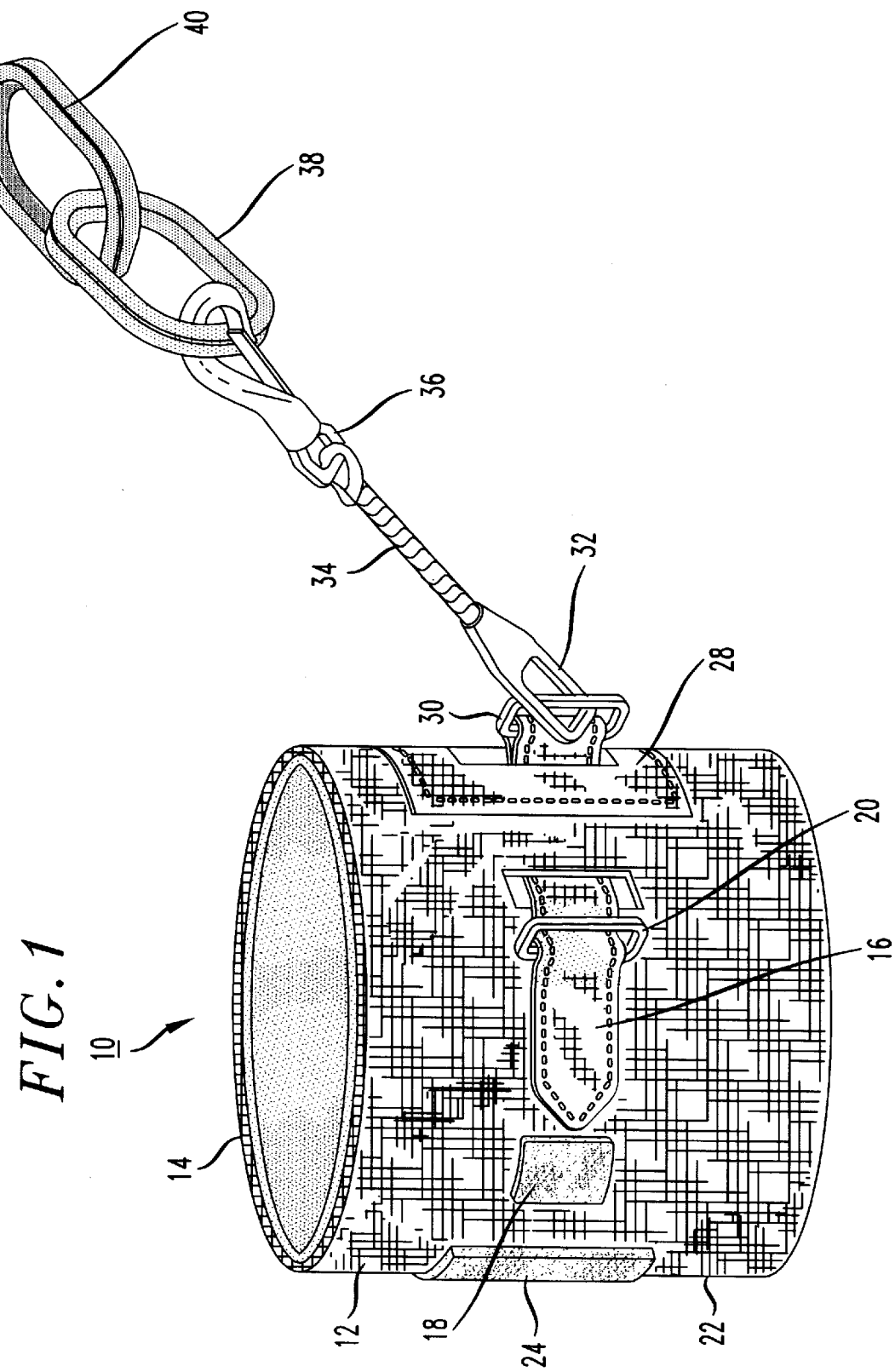
FIG. 1 is a side view of the leash assembly.

Referring now to the drawings and particularly FIG. 1 there is illustrated a leash assembly, generally indicated as 10, of the present invention comprised of an elastic band or sleeve member 12 defining a chamber 14 for the receipt of the arm of an individual. The elastic band or sleeve member 12 is preferably constructed of an elastic stretch weave material, such that it can easily be slipped over the hand, wrist, forearm and elbow of the individual and positioned about the humerus region of the upper arm of the individual. The elastic band or sleeve member 12 and concomitant chamber 14 are dimensioned to accommodate arms of varying circumferences.

The elastic band member 12 is secured about the humerus portion of the upper arm of the individual by means of a hook and loop fastener means 16, preferably positioned to the outer circumference of the elastic band or sleeve member 12 facing away from the thoracic region of the individual. Hook and loop fastener assembly 16 is secured by a permanently affixed anchor member 18 and a permanently secured ring member 20. The hook and loop fastener means 16 is secured to the anchor member 18, passes through ring member 20 and overlaps on itself utilizing the hook and loop fastener assembly 18 to secure elastic band member 12 to the desired pressure about the humerus portion of the individual's arm. This circumferential adjustment of the chamber 14 of elastic band member 12 is analogous to that of a blood pressure cuff.

Positioned on the posterior portion 22 of elastic band member 12 is a posterior reinforced spine member 24, preferably constructed of a pliable, flexible plastic member (not shown) oversewn with a double weave elastic similar to that of elastic arm band 12. The posterior spine member 24 serves as a stiffener and is preferably positioned in a horizontal relationship to the elastic arm band 12 to provide support and decrease undesirable pulling forces from the dog or the animal at the end of the leash to be described hereafter.

Positioned on the anterior portion 20 of elastic band member 12, there is provide an anterior spine member 28, also preferably constructed of pliable, flexible plastic member (not shown) oversewn with a double weave elastic which is positioned vertically with respect to its relationship to the elastic arm band 12. Anterior spine member 28 is reinforced to accommodate a ring member 30 in sewn on relationship with respect to anterior spine member 28. The ring member 30 is preferably be a D-ring.

There is secured to ring member 30 a short portion of elastic cord or bungee cord 34. Elastic cord or bungee cord 34 may be secured by a loop fastener 32 or a hook means. The opposing end of elastic cord or bungee cord 34 is secured to a swivel hook 36 from which depends a quick release hook, such as a hook clasp 38. The quick release or hook clasp 38 is for receipt of the loop or user's end of a dog or animal leash 40. The elastic cord or bungee cord 34 is of a relatively short length, preferably between two and three inches and because of its resilient elastic nature, serves to absorb irregular or tension pulling forces encountered in the exercise.

Figure 2:
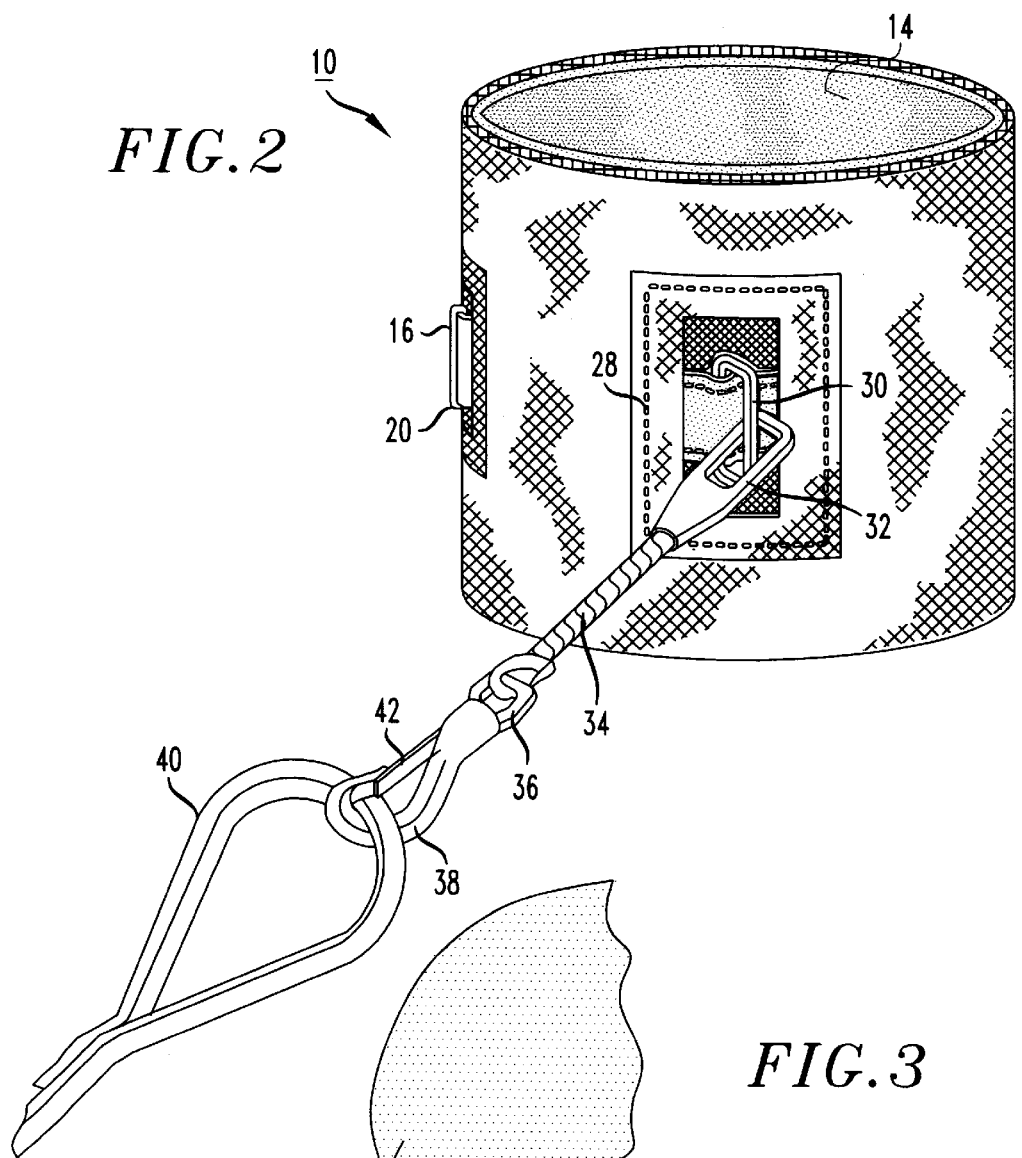
FIG. 2 is a prospective elevational view of the leash assembly.

FIG. 2 is a front perspective view of the leash assembly 10 which more fully depicts the anterior spine member 28 and ring member 30. It can be readily seen that the leash 40 for the dog or animal is secured within hook clasp 38 and the short portion of elastic cord or bungee cord 34 provides some resiliency between the leash 40 and the elastic arm band member 12. Still further, the leash 40 can be quickly released from the leash assembly by means of depressing locking gate 42 on hook clasp 38 with the user's opposing arm and slipping the loop of leash 40 out of the hook clasp 38.

Figure 3:
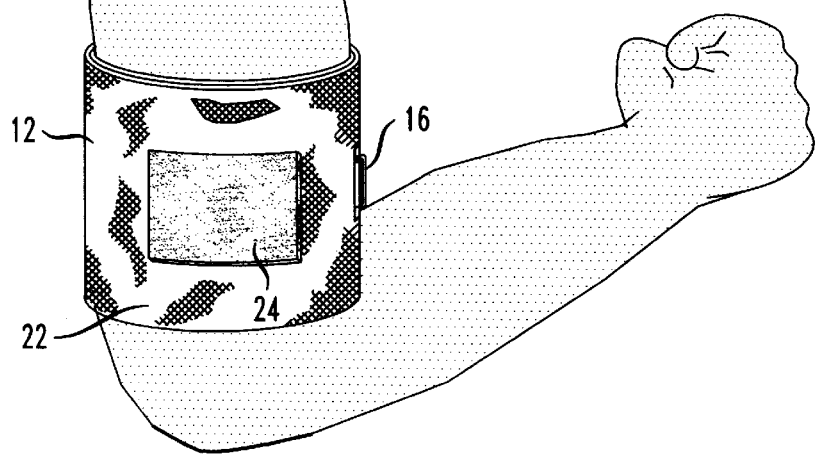
FIG. 3 is a rear view of the leash assembly.

FIG. 3 is a rear view of the leash assembly 10 which illustrates posterior reinforced spine member 24. A pliable, flexible plastic strip (not shown) is oversewn with elastic material similar to that of arm band 12 so as to provide additional support. Spine member 24 may be positioned vertically in relationship to arm band 12 but is preferably positioned in horizontal relationship.

Figure 4:
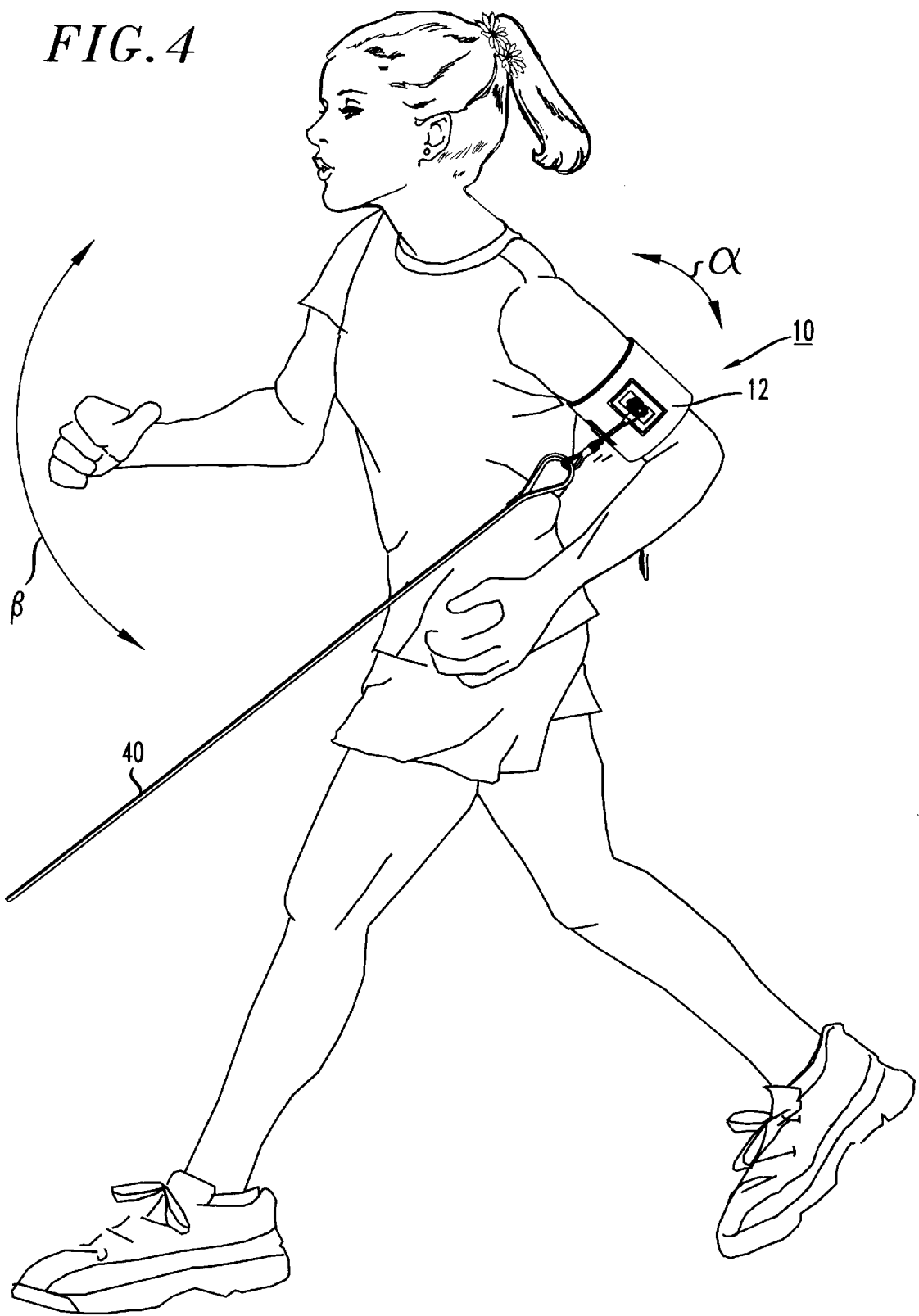
FIG. 4 is a prospective elevational view of the leash assembly secured about the arm of an individual.

FIG. 4 illustrates the leash assembly secured to the humerus region of the upper arm of an individual user. It is evident that the leash assembly 10 and the leash 40 secured thereto are not subjected to a significant arc of motion relative to the shoulder when the user power walks, jogs or runs using a pumping motion of the arms. The arc generated is significantly less than the arc generated if the leash 40 were to be hand held by the user. Arc a represents the arc that dog leash 40 and leash assembly 10 would experience and arc b represents the arc that dog leash 40 would experience if hand held by the user when power walking or jogging with a pumping arm motion. Further, while the leash assembly 10 depicted in FIG. 4 is illustrated as being worn over clothing, the leash assembly 10 can be worn directly on the skin of the humerus region of the arm. FIG. 3.

Figure 5:
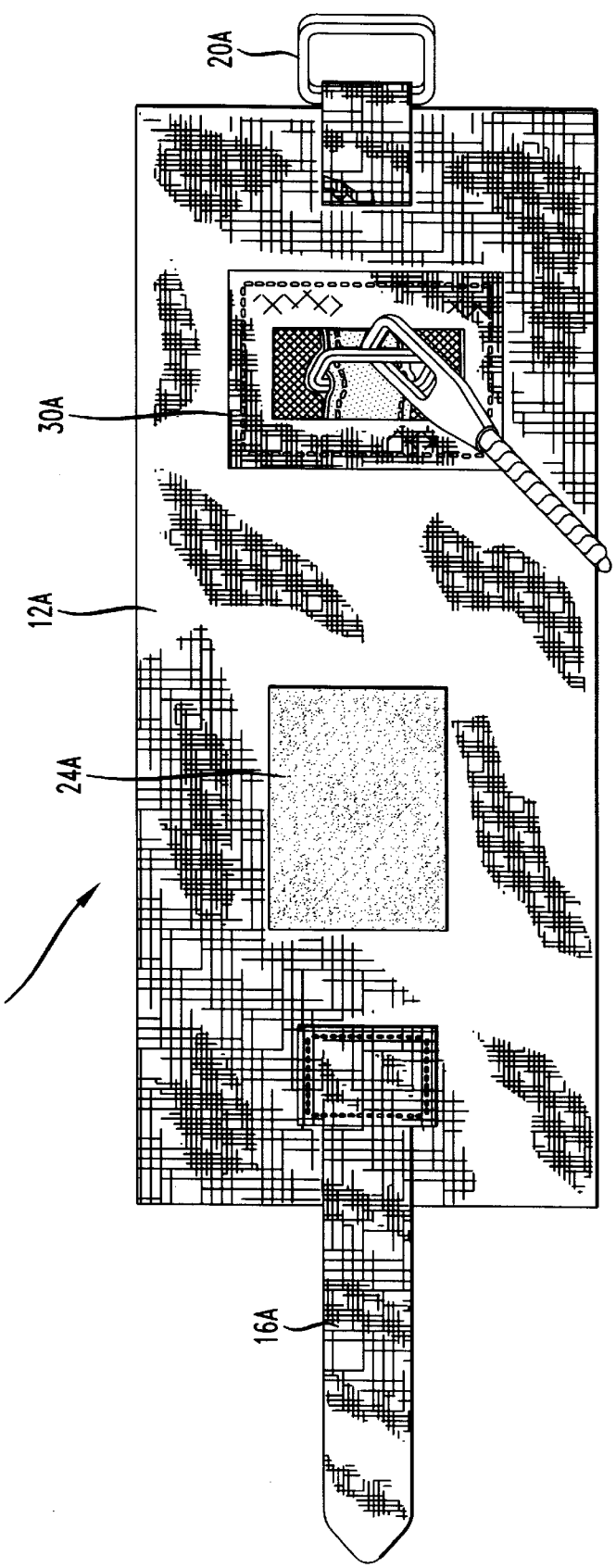
FIG. 5 is a plan view of a second embodiment of the leash assembly.

FIG. 5 is a planar view of a second embodiment of the leash assembly. The leash assembly is described in FIGS. 1 through 4 and is of a tubular construction designed to slip over the hand, wrist and forearm of the individual and then be tightened about the humerus region of the arm. In this second embodiment as illustrated in FIG. 5, leash assembly 10A is identical with the exception that it is of a planar construction designed to be formed into a tubular assembly about the humerus region of the arm by the individual. This configuration, elastic band member 12A is generally rectangular in shape having the hook and loop fastener member 16A positioned at one end with the associated ring member 20A positioned at the opposing end. The user would position the elastic band member 12A about the inner arm such that the user would have access to hook and loop fastener 16A on the outer portion of the arm in order to secure elastic band member 12A around the humerus region of the upper arm. This would position reinforced spine member 24A in the appropriate position in the posterior of the arm and anterior spine member 30A on the anterior portion of the arm. All other aspects as described with respect to FIGS. 1 through 4 would be identical with respect to leash assembly 10A.

While the present leash assembly 10 and 10A is described with respect to an elastic member of a woven or double weave material such that it is pliable and flexible so as not to have a pinching effect on the upper arm of the individual whether the leash assembly is worn on the skin or over clothing, a cushion layer 46 (see FIG. 2) may be formed about the inner surface of chamber 14 or on the reverse side of leash assembly 10A as illustrated in FIG. 5 so as to provide additional comfort to the user.

Applicant's upper arm mounted leash provides the hands free environment while exercising the dog or animal, maintains control over the dog or animal, and allows the user and the dog or animal to exercise at an increased rate, such as power walking, jogging or a full run without subjecting the dog, animal or user to any deleterious pulling forces. This is accomplished by removably securing the leash to the assembly on the upper arm of the user, which is proximate to the shoulder joint and therefore greatly reduces the degree of arc to which the leash is subjected when the user runs with a pumping arm motion.

Additionally, it is desirable that such an arm band provides sufficient security for control of the animal, but does not interfere with the brachial artery and circulation of blood in the arm. This is accomplished by Applicant's novel leash assembly which incorporates reinforcing spinal members so as to provide the necessary rigidity and flexibility without interfering with blood circulation in the arm.

While the present invention has been disclosed with respect to the exemplary embodiment thereof, it will be recognized by those of ordinary skill in the art that many changes and modifications may be made to the apparatus without departing from the spirit and scope of the invention. Therefore it is manifestly intended that the apparatus be limited only by the claims and the equivalence thereof.

We claim:

1. An animal leash assembly for positioning about the humerus portion of the arm of an individual in contemplation of an exercise regime wherein an animal accompanies said individual in a walking, jogging or running mode, which leash assembly comprises:

an elastic band member defining a chamber for positioning about said humerus portion of an arm of said individual;

a reinforced spine member mounted on said elastic band member for positioning about the posterior portion including brachial portion of said humerus portion of said arm of said user;

a fastening member mounted on said elastic band member in spaced apart relationship to said reinforced spine member; said fastening member comprising a hook and loop fastener means secured to, an anchor member directly attached to said elastic band, said hook and loop fastener means passes through, a ring member secured to said anchor member, and said hook and loop fastener means overlaps onto itself utilizing the hook and loop fastener means to secure said elastic band member to a desired pressure about the humerus portion of the individuals arm, an elastic line member mounted to said fastening member and having an animal leash engaging coupling member; and an adjustable restraining means mounted on said elastic band member for maintaining said elastic band member in position about said humerus portion of said arm of said individual during said exercise regime.

2. The animal leash assembly in accordance with claim 1 wherein said spine member maintains spaced apart relationship of said elastic band member with said brachial portion of said humerus portion of said arm of said individual during said exercise regime.

3. The animal leash assembly in accordance with claim 2 wherein said spine member comprises a pliable, flexible plastic member overlayed with said elastic material.

4. The animal leash assembly in accordance with claim 3 wherein said spine member is mounted in horizontal relationship with respect to said elastic band member.

5. The animal leash assembly in accordance with claim 1 wherein said spine member positions said elastic band member so as not to interfere with said brachial artery thus preventing the stoppage or interference with circulation.

6. The animal leash assembly in accordance with claim 1 wherein said elastic band member is cylindrically-shaped and is formed of a woven elastic material.

7. The animal leash assembly in accordance with claim 1 wherein said elastic band member is cylindrically-shaped and is formed of a double weave elastic material.

8. The animal leash assembly in accordance with claim 1 and further including an animal leash coupled to said animal leash engaging coupling member.

9. The animal leash assembly in accordance with claim 1 wherein said chamber defined by said elastic band member is lined with a cushion layer.

10. The animal leash assembly in accordance with claim 1 wherein said elastic band member is generally planar and formable into a cylindrically-shaped chamber for positioning about the humerus portion of the arm.

11. The animal leash assembly in accordance with claim 10 wherein said elastic band member is formed of a woven elastic material.

12. The animal leash assembly in accordance with claim 10 is formed of a double woven elastic material.

13. The animal leash assembly in accordance with claim 6 wherein said cylindrically-shaped chamber defined by said elastic band member is lined with a cushion layer.

* * * * *